(12) United States Patent
Chen et al.

(10) Patent No.: US 8,475,101 B2
(45) Date of Patent: Jul. 2, 2013

(54) LOCKING SCREW

(75) Inventors: Peng-Yu Chen, Shenzhen (CN); Hung-Ti Su, Taipei Hsien (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 273 days.

(21) Appl. No.: 12/916,589

(22) Filed: Oct. 31, 2010

(65) Prior Publication Data
US 2012/0009042 A1    Jan. 12, 2012

(30) Foreign Application Priority Data
Jul. 7, 2010   (CN) .......................... 2010 1 0218455

(51) Int. Cl.
   F16B 39/24   (2006.01)
   F16B 39/26   (2006.01)
   F16F 1/06    (2006.01)
   F16F 1/12    (2006.01)

(52) U.S. Cl.
   USPC ........... 411/349; 411/347; 411/352; 411/552; 411/544; 411/916; 267/175; 267/177

(58) Field of Classification Search
   USPC ................. 411/153, 347, 337, 352, 349, 552, 411/516, 916, 12, 530, 549–551, 929.1, 426, 411/438, 535, 544; 267/174, 175, 177
   See application file for complete search history.

(56) References Cited

U.S. PATENT DOCUMENTS

| | | | |
|---|---|---|---|
| 556,082 A * | 3/1896 | Boedinghaus .................. 52/705 |
| 602,378 A * | 4/1898 | Thomson ........................ 73/277 |
| 617,492 A * | 1/1899 | Love ............................... 52/705 |
| 1,169,561 A * | 1/1916 | Nichols .................... 137/516.23 |
| 1,679,620 A * | 8/1928 | Moore ......................... 411/347 |
| 2,631,348 A * | 3/1953 | Bailey .......................... 411/349 |
| 2,901,237 A * | 8/1959 | Gruer ........................... 267/176 |
| 3,030,088 A * | 4/1962 | Devine et al. ................. 299/109 |
| 3,045,308 A * | 7/1962 | Tobey .......................... 411/352 |
| 3,061,054 A * | 10/1962 | Simmonds ................... 52/787.1 |
| 3,204,680 A * | 9/1965 | Barry ........................... 411/349 |
| 3,250,559 A * | 5/1966 | Sommerfeld ................. 292/251 |
| 3,256,594 A * | 6/1966 | Howard et al. ................. 29/227 |
| 3,343,581 A * | 9/1967 | Martin et al. ................. 411/349 |
| 3,437,119 A * | 4/1969 | Dey ............................. 411/349 |
| 3,465,803 A * | 9/1969 | Swanstrom et al. .......... 411/349 |
| 4,204,566 A * | 5/1980 | Kirrish et al. ................. 411/324 |
| 4,442,571 A * | 4/1984 | Davis et al. .................. 411/552 |
| D283,591 S * | 4/1986 | Swanstrom .................... D8/387 |
| 4,716,631 A * | 1/1988 | Gay ............................ 24/265 B |
| 4,909,012 A * | 3/1990 | Thompson et al. ........ 52/745.21 |

(Continued)

*Primary Examiner* — Victor Batson
*Assistant Examiner* — Tyler Johnson
(74) *Attorney, Agent, or Firm* — Altis Law Group, Inc.

(57) ABSTRACT

A locking screw for connecting two or more articles together is provided. The screw includes an externally threaded shaft, a head, and an elastic member. The head defines a chamber in which a spiral groove is defined. The shaft extends from the bottom of the chamber; and the elastic member is arranged around the shaft and one end of the elastic member is received in the spiral groove of the chamber and another end abuts against an article. The elastic member can be rotated around the longitudinal axis of the shaft, to change the length of the elastic member, so that enough tension is created to ensure locking the screw in place and prevent any rotation, thus maintain a tight engagement among the articles.

4 Claims, 1 Drawing Sheet

U.S. PATENT DOCUMENTS

| | | | |
|---|---|---|---|
| 5,083,515 A * | 1/1992 | Seksaria et al. | 109/49.5 |
| 5,361,925 A * | 11/1994 | Wecke et al. | 220/325 |
| 5,370,488 A * | 12/1994 | Sykes | 411/551 |
| 6,331,937 B1 * | 12/2001 | Bartyzel | 361/679.54 |
| 6,375,171 B1 * | 4/2002 | Zimmermann et al. | 267/137 |
| 6,471,197 B1 * | 10/2002 | Denk et al. | 267/175 |
| 6,634,844 B2 * | 10/2003 | Huber | 411/551 |
| 6,644,903 B1 * | 11/2003 | Arand | 411/352 |
| 6,676,118 B2 * | 1/2004 | Chou | 267/177 |
| 6,955,512 B2 * | 10/2005 | Allen et al. | 411/353 |
| 7,025,343 B2 * | 4/2006 | Chou | 267/177 |
| 7,262,969 B2 * | 8/2007 | Lee et al. | 361/704 |
| 7,270,320 B2 * | 9/2007 | Menzel et al. | 267/175 |
| 7,342,796 B2 * | 3/2008 | Aukzemas | 361/719 |
| 7,344,345 B2 * | 3/2008 | Aukzemas | 411/372 |
| 7,349,218 B2 * | 3/2008 | Lu et al. | 361/679.32 |
| 7,357,380 B2 * | 4/2008 | Menzel et al. | 267/179 |
| 7,391,617 B2 * | 6/2008 | Veh | 361/719 |
| 7,922,432 B2 * | 4/2011 | Chiu | 411/107 |
| D639,647 S * | 6/2011 | Summers | D8/387 |
| D639,648 S * | 6/2011 | Summers | D8/387 |
| D639,649 S * | 6/2011 | Summers | D8/387 |
| D639,650 S * | 6/2011 | Summers | D8/387 |
| D639,651 S * | 6/2011 | Summers | D8/387 |
| 7,990,722 B2 * | 8/2011 | Cao et al. | 361/721 |
| 8,066,461 B2 * | 11/2011 | Travers | 411/352 |
| 8,074,705 B2 * | 12/2011 | Lu | 165/80.3 |
| 8,122,945 B2 * | 2/2012 | Kuo et al. | 165/80.3 |
| D656,392 S * | 3/2012 | McKenna | D8/382 |
| 8,256,736 B2 * | 9/2012 | Lin | 248/638 |
| 2001/0024607 A1 * | 9/2001 | Frattarola | 411/107 |
| 2002/0172574 A1 * | 11/2002 | McCormack et al. | 411/352 |
| 2004/0165966 A1 * | 8/2004 | Aukzemas et al. | 411/353 |
| 2005/0129461 A1 * | 6/2005 | Bruno | 403/408.1 |
| 2006/0245165 A1 * | 11/2006 | Lin | 361/704 |
| 2007/0242439 A1 * | 10/2007 | Lu et al. | 361/719 |
| 2009/0154110 A1 * | 6/2009 | Ma et al. | 361/719 |
| 2012/0009042 A1 * | 1/2012 | Chen et al. | 411/347 |
| 2012/0247815 A1 * | 10/2012 | Rao et al. | 174/252 |
| 2012/0251265 A1 * | 10/2012 | Chiu | 411/349 |

* cited by examiner

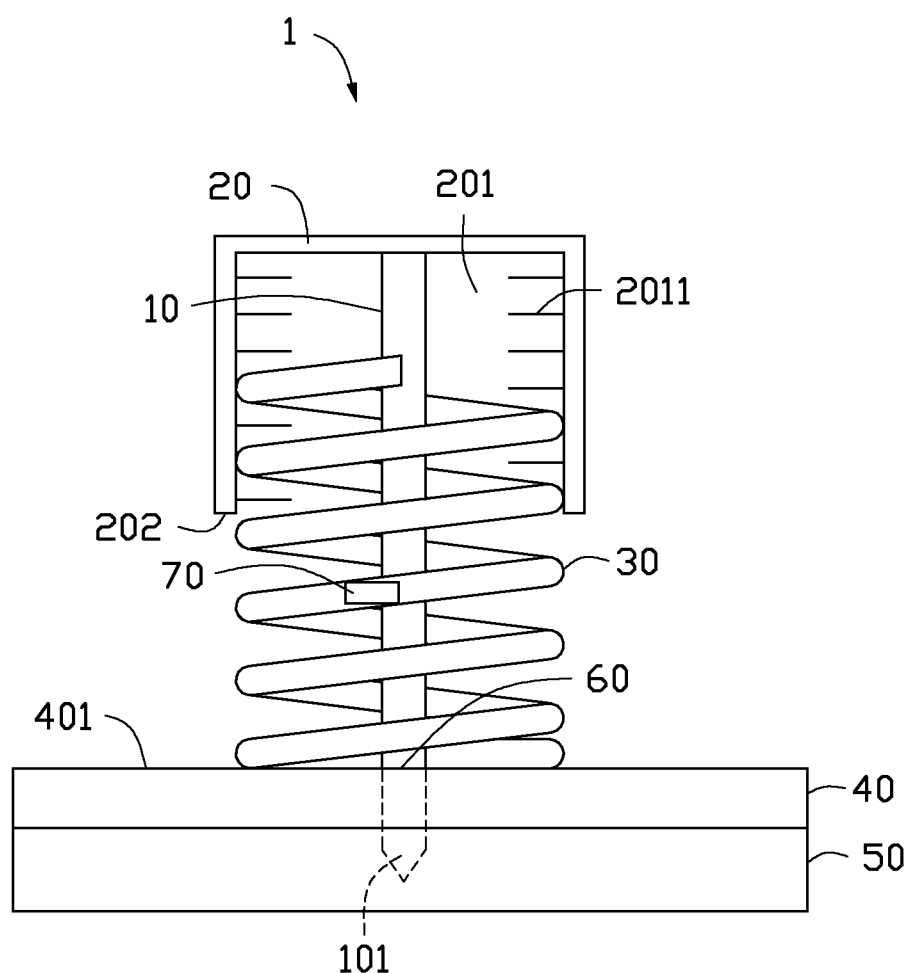

LOCKING SCREW

BACKGROUND

1. Technical Field

The present disclosure relates to screws and, more particularly, to a screw having an elastic member to prevent the screw from loosening.

2. Description of Related Art

Screws are used to connect various articles together. Special nuts and lock washers are often used to prevent a screw from loosening. The need for additional elements to prevent loosening adds to the expense and complication of attaching articles together.

BRIEF DESCRIPTION OF THE DRAWINGS

The components in the drawing are not necessarily drawn to scale, the emphasis instead being placed upon clearly illustrating the principles of the loosening proof screw.

The drawing is a schematic view of a locking screw in accordance with an exemplary embodiment with a head of the screw cut-away to exposed internal details.

DETAILED DESCRIPTION

Referring to the drawing, a locking screw 1 can be used to connect two or more articles together. In the embodiment, a first article 40 and a second article 50 are illustrated as an example. The locking screw 1 includes an externally threaded shaft 10, a head 20, and an elastic member 30. The articles 40 and 50 can be connected together by the engagement of the screw 1 with internally threaded holes of the articles 40 and 50.

The head 20 defines a chamber 201 in which a spiral groove 2011 is defined. The spiral groove 2011 is configured to receive one end of the elastic member 30. The shaft 10 extends from the bottom of the chamber 201.

In use, the elastic member 30 is arranged around the shaft 10. One end of the elastic member 30 is received in the spiral groove 2011 of the chamber 201, and the other opposite end of the elastic member 30 abuts against the top surface 401 of the first article 40 when the shaft 10 is screwed into the threaded holes of the first article 40 and the second article 50. The elastic member 30 is rotatable in the spiral groove 2011 to change an effective length of the elastic member 30 along a longitudinal axis of the shaft 10. In this embodiment, the effective length of the elastic member 30 along the longitudinal axis of the shaft 10 is the length of the elastic member 30 between an end 202 of the head 20 and the top surface 401 of the article 40. As the effective length of the elastic member 30 changes, tension produced between the elastic member 30, the head 20, the first articles 40 and the second article 50 is adjusted. In the embodiment, the elastic member 30 is a coil spring.

Once the screw 1 is installed, tension created by compression of the elastic member 30 ensures threads of the shaft 10 steadily resist against the internal threads of the first and second articles 40, 50 so that the screw 1 cannot back out of the through holes of the articles 40, 50, such as from vibration. When the elastic member 30 is rotated in the spiral groove 2011 and the effective length of the elastic member 30 is changed, enough tension is created to ensure locking the screw 1 in place and prevent any rotation, thus maintain a tight engagement between the first article 40 and the second article 50.

In the embodiment, a graduation line 60 can be set on the lateral surface of the shaft 10 so that, for example, when many screws 1 are employed they can all be adjusted to the same degree of tension, and is configured to indicate the distance D from the end 202 of the head 20 to the top surface 401 of the first article 40. For example, it means that the distance D is a standard distance when the graduation line 60 is flush with the top surface 401. The distance D can be changed by rotating the elastic member 30 around the longitudinal axis of the shaft 10 through auxiliary tools, so that the length of the elastic member 30 from the end 202 to the top surface 401 can be changed, and the tension given by the elastic member 30 can be changed accordingly.

In the embodiment, the locking screw 1 also includes flattened portion 70 on lateral sides of the elastic member 30 to provide gripping surfaces for tools used to adjust the elastic member 30.

Although the current disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A locking screw, comprising:
    a head defining a chamber in which a spiral groove is defined;
    an externally threaded shaft extending from a bottom of the chamber; and
    an elastic member arranged around the shaft and one end of the elastic member received in the spiral groove of the chamber, and another end of the elastic member to abut against an article when the shaft is screwed into the article, wherein the elastic member is rotatable in the spiral groove to change an effective length of the elastic member along a longitudinal axis of the shaft, and as the effective length of the elastic member changes, tension produced between the elastic member, the head, and the article is adjusted.

2. The locking screw according to claim 1, wherein the elastic member is a coil spring.

3. The locking screw according to claim 1, wherein a graduation line is set on the lateral surface of the externally threaded shaft.

4. The locking screw according to claim 1, further comprising flattened portion on lateral sides of the elastic member to provide gripping surfaces for tools used to adjust the elastic member.

* * * * *